United States Patent [19]
Ide

[11] Patent Number: 5,004,450
[45] Date of Patent: Apr. 2, 1991

[54] BELT FOR A CONTINUOUSLY VARIABLE TRANSMISSION

[75] Inventor: Tohru Ide, Tokyo, Japan

[73] Assignees: Fuji Jukogyo Kabushiki Kaisha, Tokyo, Japan; Van Doorne's Transmissie B.V., Tilburg, Netherlands

[21] Appl. No.: 428,342

[22] Filed: Oct. 27, 1989

[30] Foreign Application Priority Data

Nov. 4, 1988 [JP] Japan ................................ 63-280201
Nov. 4, 1988 [JP] Japan ................................ 63-280202

[51] Int. Cl.$^5$ .............................................. F16G 1/22
[52] U.S. Cl. ................................................ 474/242
[58] Field of Search ............... 474/201, 238, 240, 242, 474/261, 272

[56] References Cited

U.S. PATENT DOCUMENTS

| | | | |
|---|---|---|---|
| 4,369,675 | 6/1986 | Petrus | 74/864 |
| 4,526,559 | 7/1985 | Smirl | 474/201 |
| 4,617,007 | 10/1986 | Miranti et al. | 474/201 |
| 4,824,424 | 4/1989 | Ide et al. | 474/242 |
| 4,826,473 | 5/1989 | Miyawaki | 474/240 |
| 4,832,671 | 5/1989 | Satoh | 474/242 |
| 4,894,049 | 1/1990 | Koppelaars | 474/240 |

Primary Examiner—Thuy M. Bui
Attorney, Agent, or Firm—Martin A. Farber

[57] ABSTRACT

A belt comprises a plurality of metal elements. Each element has a pair of contact sides engaged with pulleys. The contact side is inclined at the same slope angle as that of the pulley. The length of the contact side is different from a length of a perpendicular opposite an angle in a right-angle triangle. The angle is equal to the slope angle, and the right-angle triangle has a hypotenuse between uppermost points of both the contact sides.

5 Claims, 6 Drawing Sheets

BELT FOR A CONTINUOUSLY VARIABLE TRANSMISSION

BACKGROUND OF THE INVENTION

The present invention relates to a belt for a belt drive device, and more particularly to a belt for continuously variable belt-drive transmission for a motor vehicle.

A known continuously variable belt-drive transmission disclosed in U.S. Pat. No. 4,369,675 comprises an endless belt running over a drive pulley and a driven pulley. Each pulley comprises an unmovable conical disc and a movable conical disc which is axially moved by a fluid operated servo device so as to vary the running diameter of the belt on the pulleys in dependency on driving conditions.

The belt comprises a plurality of metal elements arranged adjacent to each other in the longitudinal direction of the belt, and a pair of endless carriers inserted in opposed slits of each element, each carrier comprising a laminated metal ring.

Referring to FIG. 9, the element E has a body portion Bp, the sides S of which abut on conical faces of disks $D_1$, $D_2$ with each disk having a slope angle $\beta$. A length $\alpha$ between the uppermost point $a_1$ and the lowermost point $b_1$ of contact side S is the same as the length of the side opposite the angle $\beta$ in a right-angle triangle $a_1 a_2 b_1$. Namely, the length $\alpha$ is expressed as $\alpha = Pw \sin \beta$, where Pw is a pitch width on a line P'—P' passing through the points $a_1$ and $a_2$.

When the element E enters the groove of the pulley at a correct attitude without distortion, as shown by a dotted line, both contact sides S of the body portion Bp appropriately rest on the slopes of the disks $D_1$, $D_2$. To the contrary, when the element E is inclined as shown by a solid line the element E touches the disks only at diagonal points $a_2$ and $b_1$. In particular, in a low belt tensioning pressure range where the tension of the carrier C is low, the inclined attitude of the element E cannot be corrected so that the element stays slanted while passing around the pulleys.

Accordingly, one of the carriers C is raised by a shoulder Sh of the element E which deviates from the normal position, so that the carrier C is excessively tensioned. As a result, the durability of the carrier C decreases. In addition, the innermost ring of the carrier C is damaged as a result of an abnormal increase in friction between the shoulder Sh and the underside of the innermost ring.

Japanese Patent Application Laid-Open 61-192944 discloses elements to eliminate the abovedescribed disadvantage. The element comprises a pair of support blocks and a compression block supported by the support block and having V-shaped surfaces which abut on the pulleys. However, the shape of the element is complicated.

SUMMARY OF THE INVENTION

The object of the present invention is to provide a belt for a belt drive device where each element of the belt is automatically adjusted to take a correct attitude when entering the pulleys.

The other objects and features of this invention will become understood from the following description with reference to the accompanying drawings.

DETAILED DESCRIPTION OF THE PREFERRED EMBODIMENTS

Figure 1:
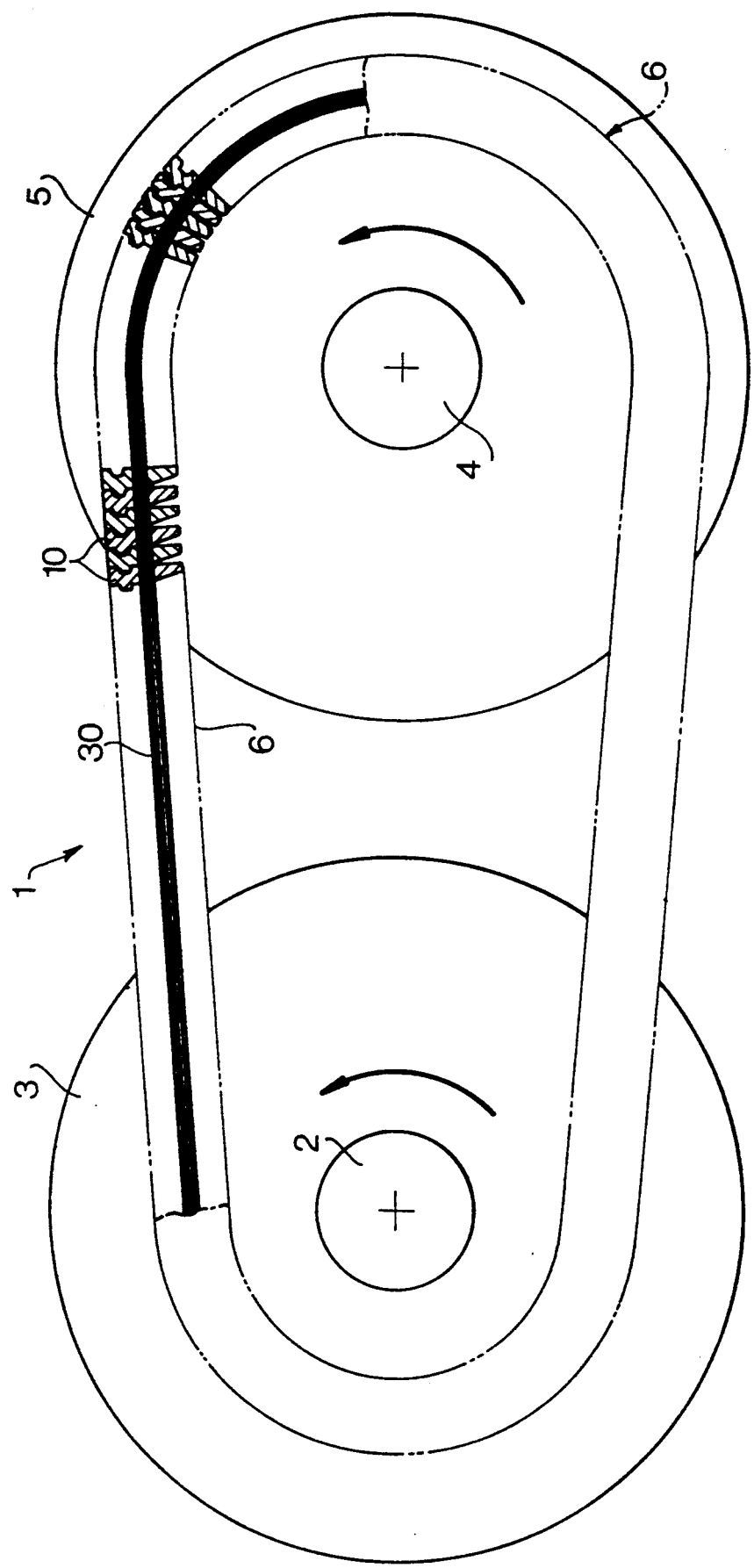
FIG. 1 is an elevational view of a belt device.
Figure 2:
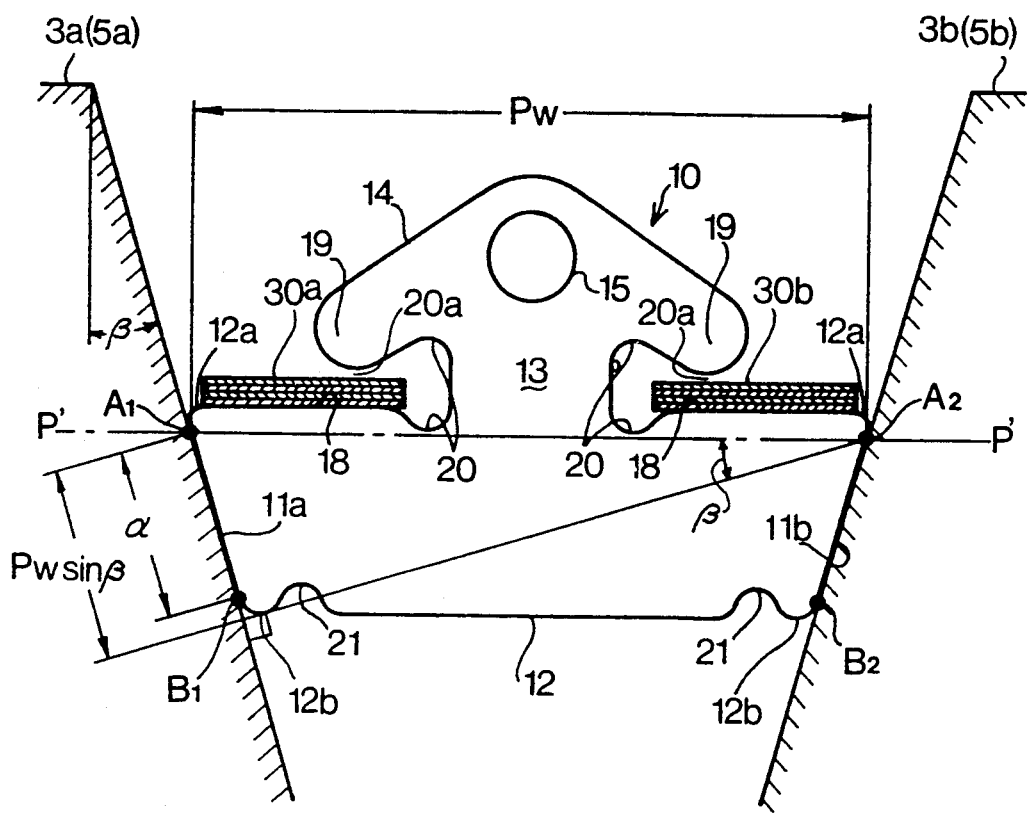
FIG. 2 is an elevational view of an element of a belt according to a first embodiment of the present invention.
Figure 3:
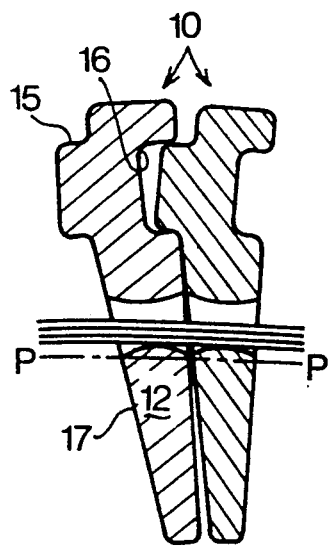
FIG. 3 is a sectional view of the elements.

Referring to FIGS. 1 to 3, a belt-device 1 to which the present invention is applied, has an input shaft 2 and an output shaft 4 provided in parallel with the input shaft 2. A drive pulley 3 and a driven pulley 5 are mounted on shafts 2 and 4 respectively. A fixed conical disc 3a of the drive pulley 3 is integral with the input shaft 2 and an axially movable conical disc 3b is axially slidably mounted on the input shaft 2. A conical face of the fixed conical disc 3a confronts a conical face of the movable conical disc 3b thereby forming a groove therebetween.

A fixed conical disc 5a of the driven pulley 5 is formed on the output shaft 4 opposite a movable conical disc 5b. Conical faces of the respective discs 5a and 5b form a groove. A belt 6 engages the drive pulley 3 and the driven pulley 5.

The belt 6 comprises a plurality of metal elements 10 arranged adjacent each other in the longitudinal direction of the belt. Each element has a body portion 12 having contacting sides 11a and 11b, a head portion 14, a pillar portion 13 at the center and a pair of horizontal slits 20a and 20a at both sides thereof, between the body portion 12 and head portion 14. The body portion 12 has curved upper and lower edges 12a and 12b. A pair of metal carriers 30a and 30b are inserted in the slits 20a and 20a.

As shown in FIG. 3, the thickness of the body portion 12 becomes smaller toward the bottom end, thereby forming an inclination 17 under a pitch line P—P. Thus, the elements 10 can pass around the pulleys. The body portion 12 has shoulders 18 at the lateral sides and the head portion 14 has ears 19 at lower side portions, each corresponding to the shoulder 18. Each shoulder 18 and ear 19 are arranged so as to engage with the carrier 30a (30b). A recess 20 is formed on each side of the pillar portion 13 so as to prevent the carrier 30 from rubbing the pillar portion 13. A recess 21 is formed on the bottom of the body portion 12 thereby balancing the distribution of pushing force exerted on the elements 10.

The carrier 30a (30b) comprises laminated rings of flexible thin strips so that bending stress which occurs when the carrier 30 passes over the pulley having a small effective radius, is decreased.

Each element 10 has a projection 15 on its one side and a dimple 16 on the other side. The projection 15 of one element 10 engages with the dimple 16 of the adjacent element with a small gap therebetween and all elements are arranged side by side. The belt 6 is thus assembled.

The contour of the body portion 12 of the element 10 is described hereinafter with reference to FIGS. 2 and 4. In FIG. 2, a contact side 11a (11b) has uppermost point $A_1$ ($A_2$) and lowermost point $B_1$ ($B_2$). A line P'—P' passing through the points $A_1$ and $A_2$ crosses the pitch line P—P (FIG. 3). Each of sides 11a and 11b has a slope angle $\beta$ which coincides with the slope angle of the conical face of the pulleys 3 (5). In accordance with the present invention, the length $\alpha$ of each contact side 11a (11b) is shorter than the length of the side opposite the angle $\beta$ in a right-angle triangle having a pitch width Pw between points $A_1$ and $A_2$ of the element 10 as a hypotenuse. In other words, the length $\alpha$ is, $\alpha < \text{Pwsin}\,\beta$. The upper curved edge 12a is formed, starting from the uppermost point $A_1$ ($A_2$). Similarly, the lower curved edge 12b starts from the lowermost point $B_1$ ($B_2$) and is arranged as follows.

Figure 4:
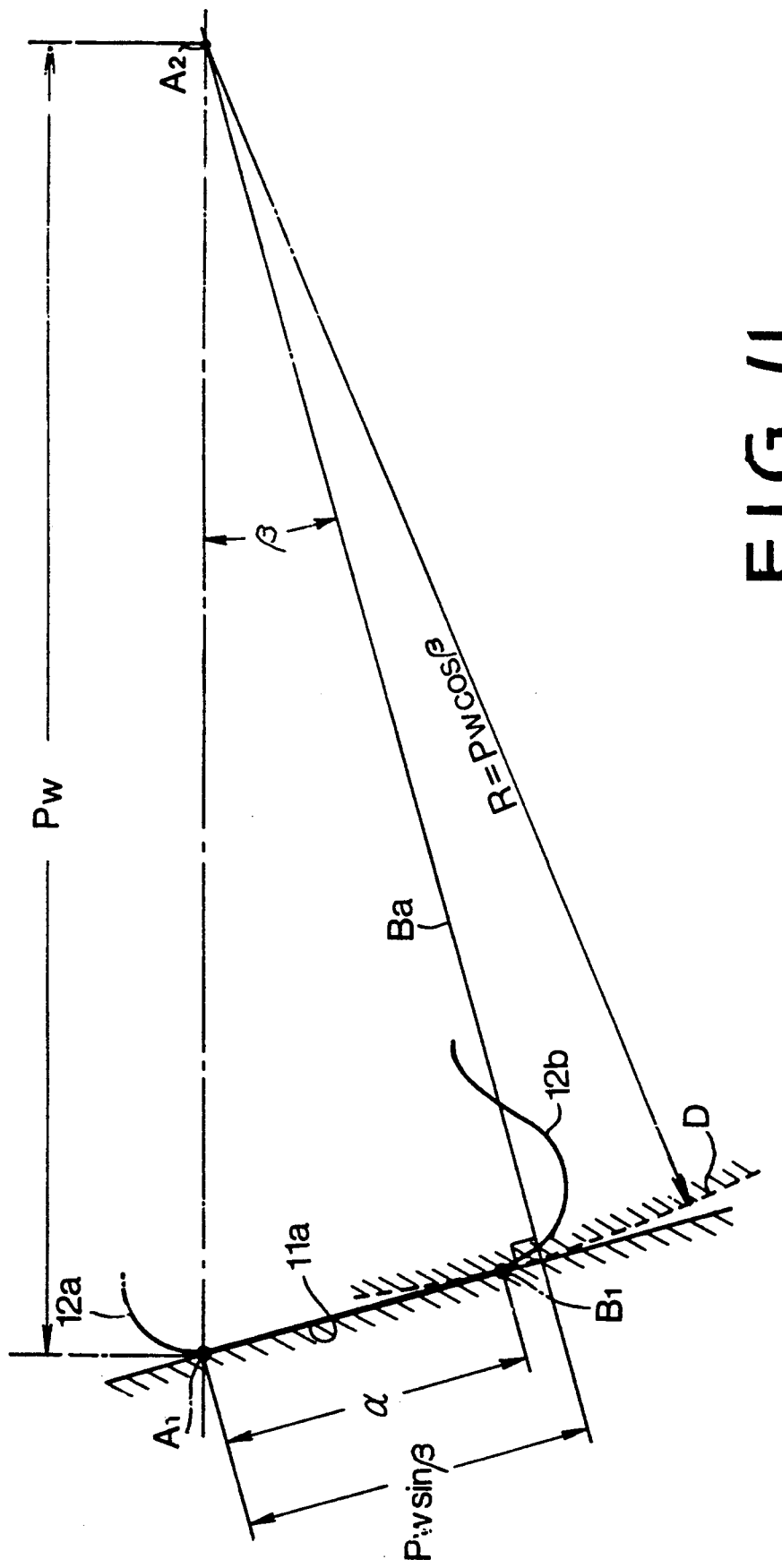
FIG. 4 an enlarged sectional view of a part of the element.

Referring to FIG. 4, the length R of a base Ba of the right-angle triangle is, $R = \text{Pwcos}\,\beta$. An arc D is a part of a circle having a center at point $A_2$ ($A_1$) and a radius of $R = \text{Pwcos}\,\beta$. Each lower curved edge 12b is formed to be positioned inside the arc D.

Figure 5:
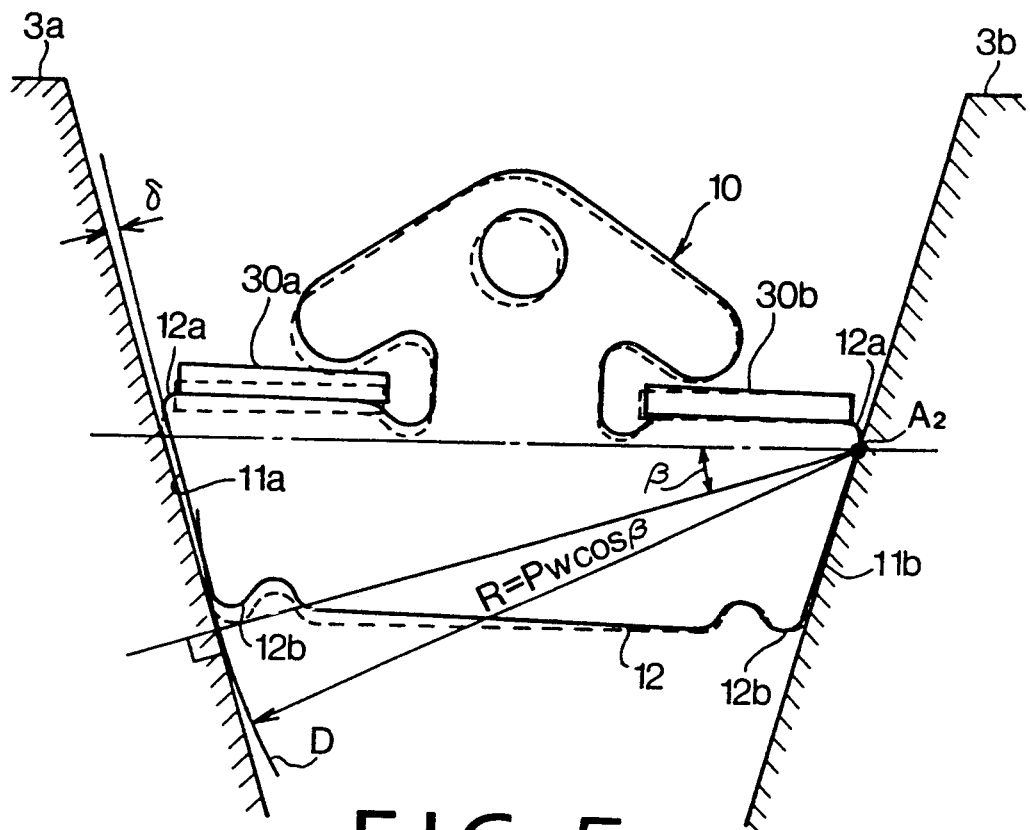
FIG. 5 is an elevational view of the element for describing the operation.

Referring to FIG. 5, assuming that the element 10 is slanted as shown by a solid line when entering one of the pulleys, for example the drive pulley 3, the side 11b touches the disk 3b at the point $A_2$. On the other hand, the other side 11a does not abut the disk 3a at any point because of the length $\alpha$ and the shape of the edge 12b, forming a gap $\delta$ therebetween. The gap $\delta$ enables the tension of the carrier 30a to downwardly shift the element 10. Thus, the element 10 is pivoted about the point $A_2$, so that the side 11a of the element 10 abuts against the conical face of the disc 3a. Consequently, the attitude of the element 10 is corrected as shown by the dotted line. In addition, the carrier 30a is driven in a normal state without being subjected to excessive tension. Thus, the durability of the carriers is extended.

Figure 6:
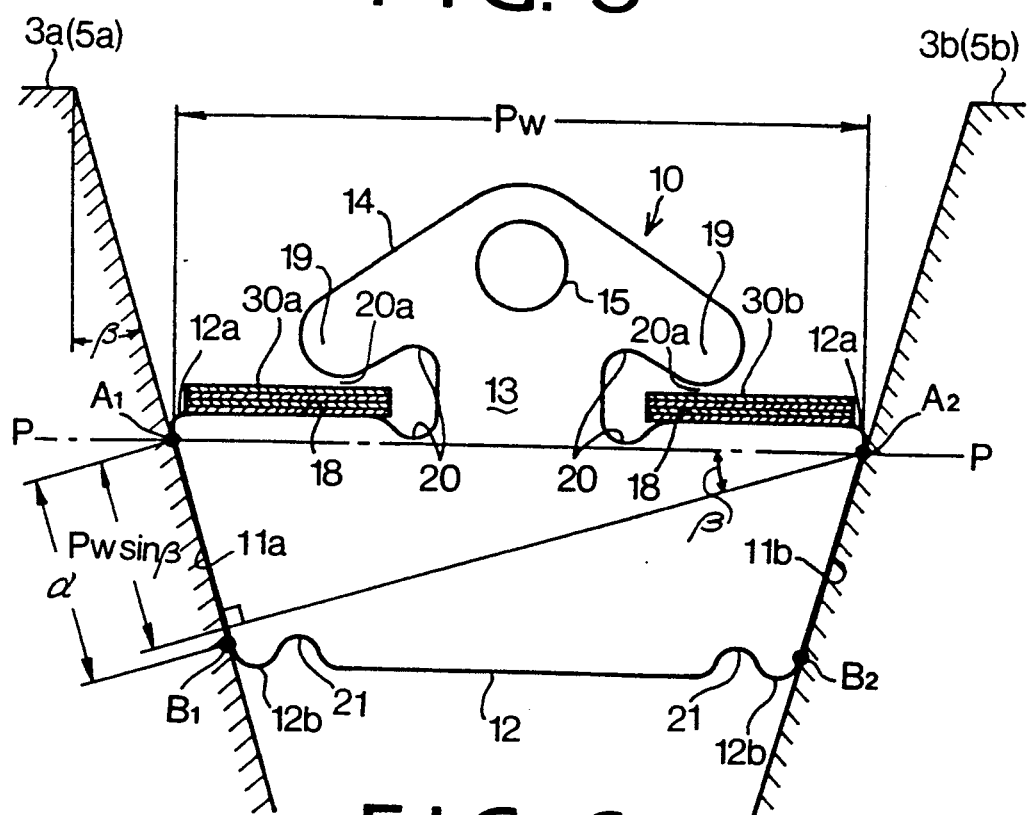
FIG. 6 is an elevational view of an element of a belt according to a second embodiment of the present invention.
Figure 7:
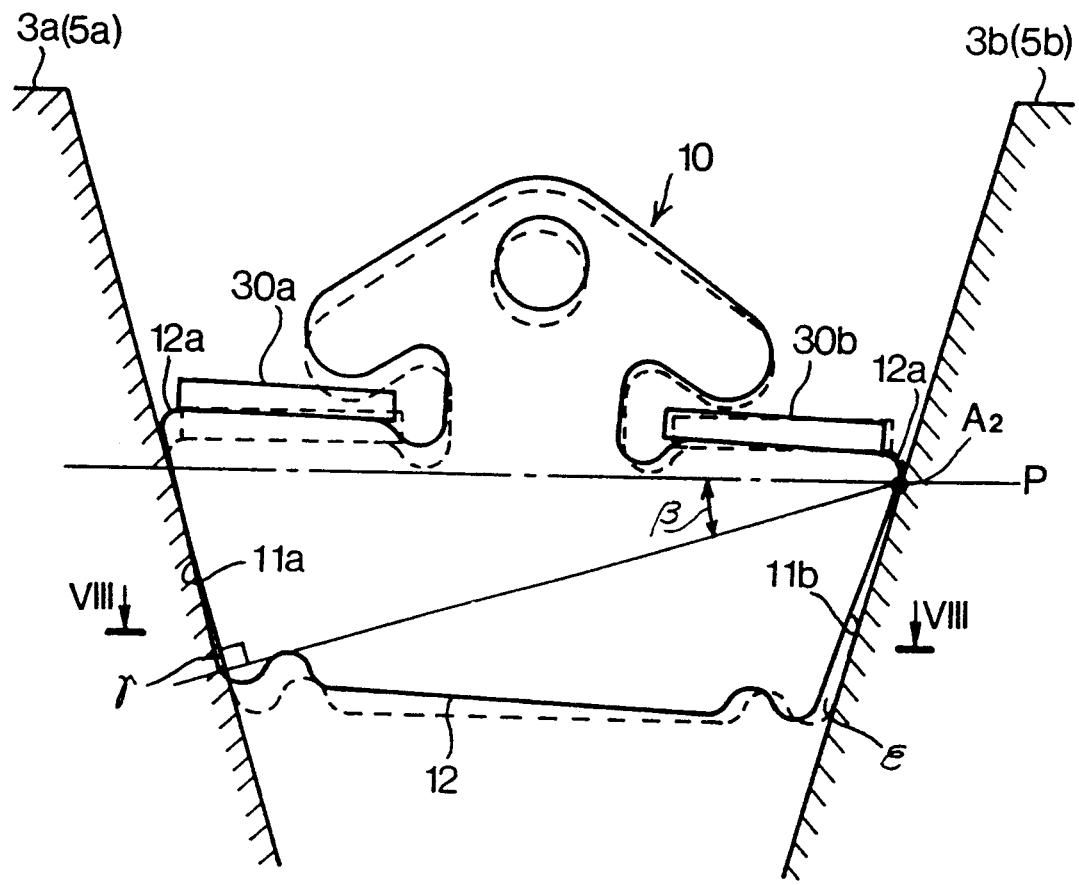
FIG. 7 is an elevational view of the element for describing the operation of the second embodiment.
Figure 8:
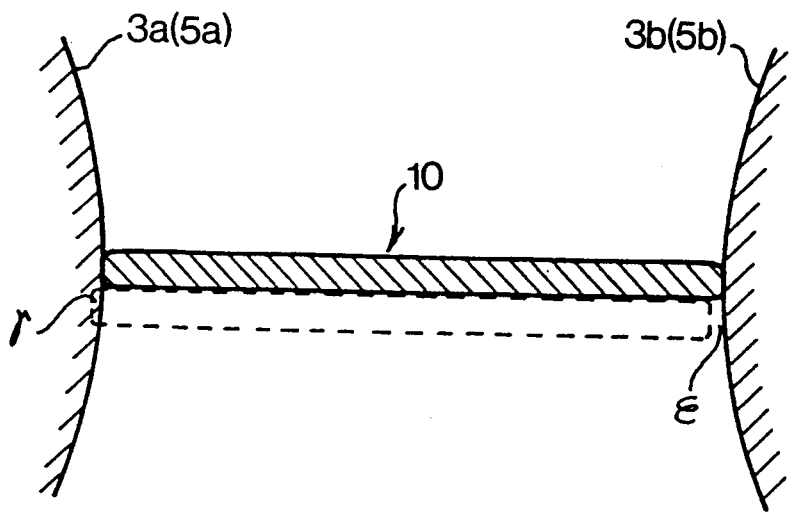
FIG. 8 is a sectional view of the element taken along a line VIII—VIII of FIG. 7.
Figure 9:
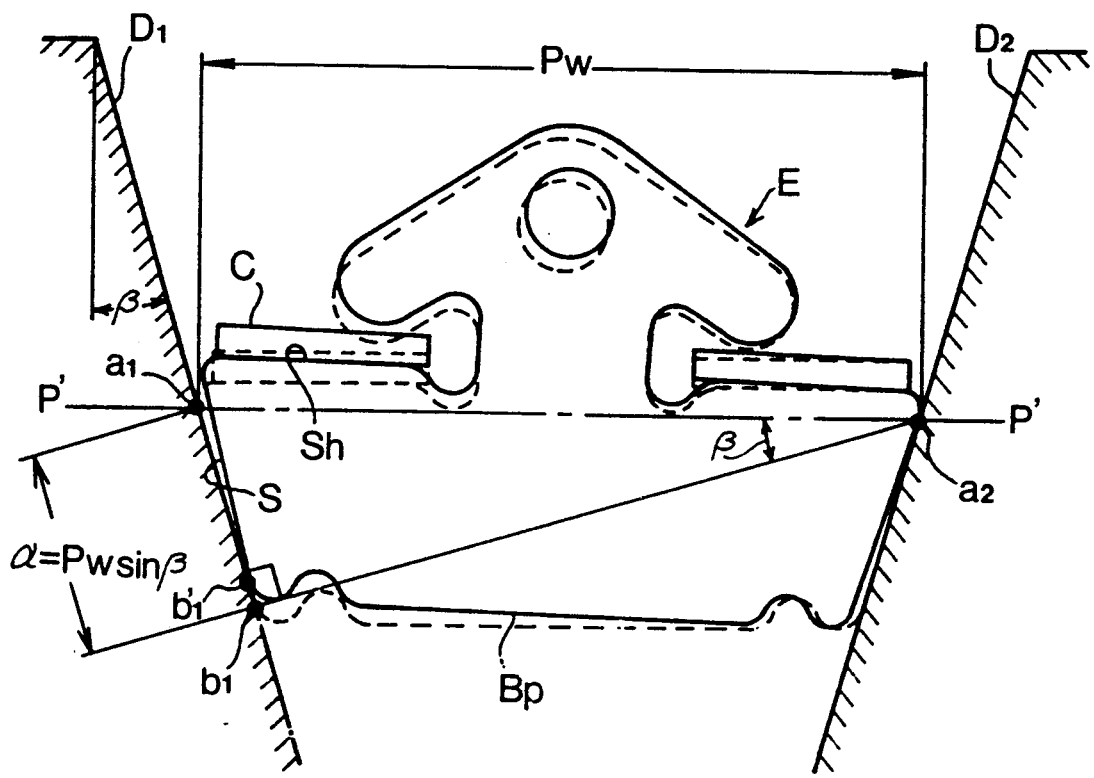
FIG. 9 is an elevational view of a conventional element.

FIGS. 6 to 8 show a second embodiment of the present invention. In the present embodiment, the length $\alpha$ of the side 11a (11b) of each element 10 is longer than Pwsin $\beta$, for example, $\alpha = \text{Pw}(\sin\beta + 0.01)$.

When the element 10 is inclined as shown by a solid line in FIG. 7 upon entering the pulley, the upper edge 12a of the side 11b makes contact with the disc 3b at the point $A_2$, and a gap e is formed between the disc and the element. However, since the sides are longer than the length Pw sin $\beta$, a lower portion $\gamma$ of the other side 11a engages with the discs 3a when entering the pulley. Accordingly, the lower portion $\gamma$ is pushed by the disc 3a, so that the element is pivoted about the point $A_2$. Consequently, the attitude of the element 10 is corrected as shown by a dotted line in FIG. 7.

From the foregoing, it will be understood that the present invention provides a belt for a belt drive device where attitudes of elements of the belt are automatically corrected. Consequently, the carriers are prevented from being subjected to excessive tension, thereby increasing the durability of the belt.

While the presently preferred embodiments of the present invention have been shown and described, it is to be understood that various changes and modifications may be made without departing from the scope of the invention as set forth in the appended claims.

What is claimed is:

1. A belt for a continuously variable transmission having a drive pulley and a driven pulley, the belt being engaged with both said pulleys, said belt comprising a plurality of metal elements arranged on an endless carrier, each of said pulleys forms a groove with an angle with respect to a line perpendicular to a rotational axis of said pulley for inserting said elements therein, each of said elements has a body portion of trapezoid shape, both sides of said trapezoid shape contact an inside of said groove, and said carrier supports said elements at a pitch width which is a longer base length of said trapezoid, the improvement in the belt wherein:

each element has a contact length of said both sides with said groove which is shorter than said pitch width multiplied by the sine of said angle; and corners of said element at the shorter base length of said trapezoid are formed inside an arc having a radius of said pitch width multiplied by the cosine of said angle, the center point of the radius of the arc being an end point of the contact length of an opposite of said side at the longer base length of said trapezoid, whereby said elements are accurately and regularly kept in said groove without inclination.

2. A belt according to claim 1, wherein said belt defines an endless pitch line, and the longer base length of said trapezoid passes through said end points and said pitch line.

3. A belt according to claim 1, wherein said body portion has an edge at the shorter base length of said trapezoid formed with said corners and a recess in said edge adjacent each said corner, the remainder of said edge being straight.

4. A belt for a continuously variable transmission having a drive pulley and a driven pulley, the belt being engaged with both said pulleys, said belt comprising a plurality of metal elements arranged on an endless carrier, each of said pulleys forms a groove with an angle with respect to a line perpendicular to a rotational axis of said pulley for inserting said elements therein, each of said elements has a body portion of trapezoid shape, both sides of said trapezoid shape contact an inside of said groove, and said carrier supports said elements at a pitch width is a longer base length of said trapezoid, the improvement in the belt wherein:

each element has a contact length of said both sides with said groove which is longer than said pitch width multiplied by the sine of said angle, whereby said elements are accurately and regularly kept in said groove without inclination.

5. A belt according to claim 4, wherein said body portion has an edge at the shorter base length of said trapezoid formed with said corners and a recess in said edge adjacent each said corner, the remainder of said edge being straight.

* * * * *